Figure 1:
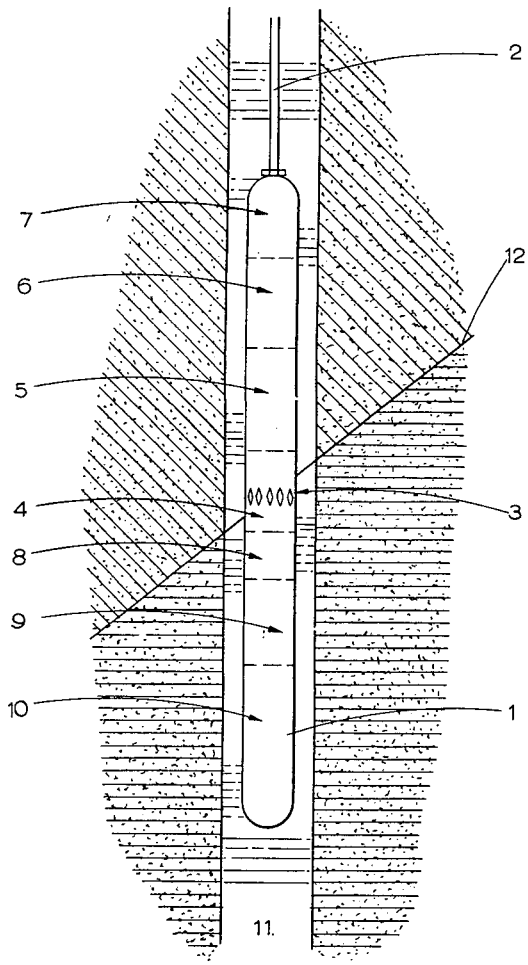

Nov. 20, 1962   J. J. JARRETT   3,065,405
BOREHOLE SURVEY APPARATUS

Filed Dec. 16, 1958   12 Sheets-Sheet 1

Inventor
J. J. Jarrett
By Glascock Downing Teebold
Attys.

Nov. 20, 1962 J. J. JARRETT 3,065,405
BOREHOLE SURVEY APPARATUS
Filed Dec. 16, 1958 12 Sheets-Sheet 2

Inventor
J. J. Jarrett
By Hancock Downing Seebold
Attys.

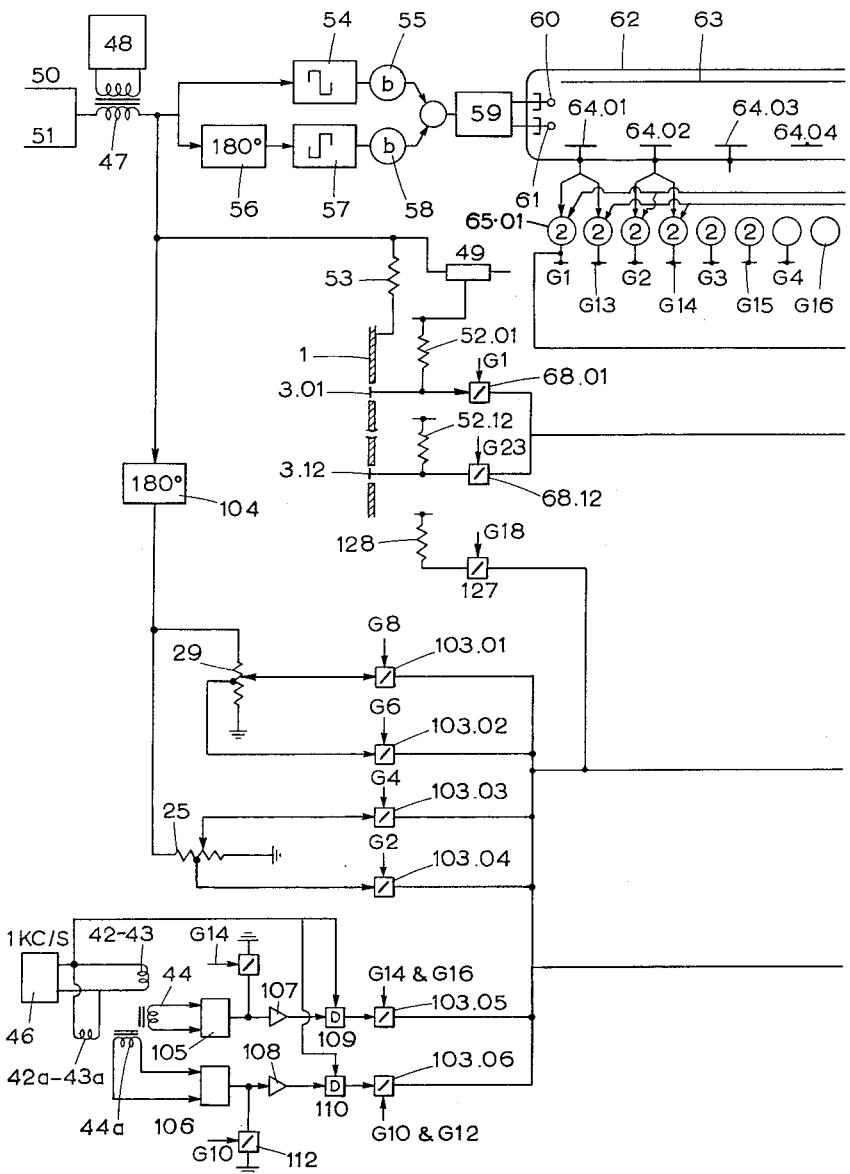
FIG.5 (part I)

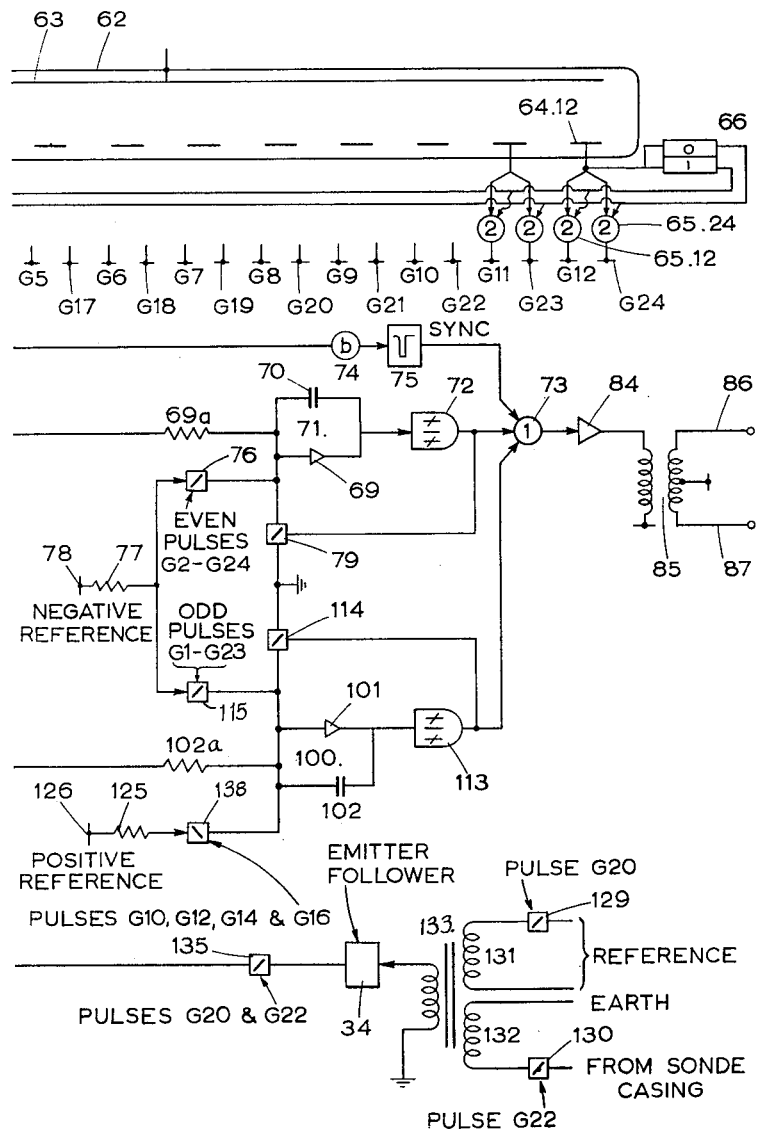
FIG.5(part II)

Nov. 20, 1962     J. J. JARRETT     3,065,405
BOREHOLE SURVEY APPARATUS
Filed Dec. 16, 1958     12 Sheets-Sheet 5
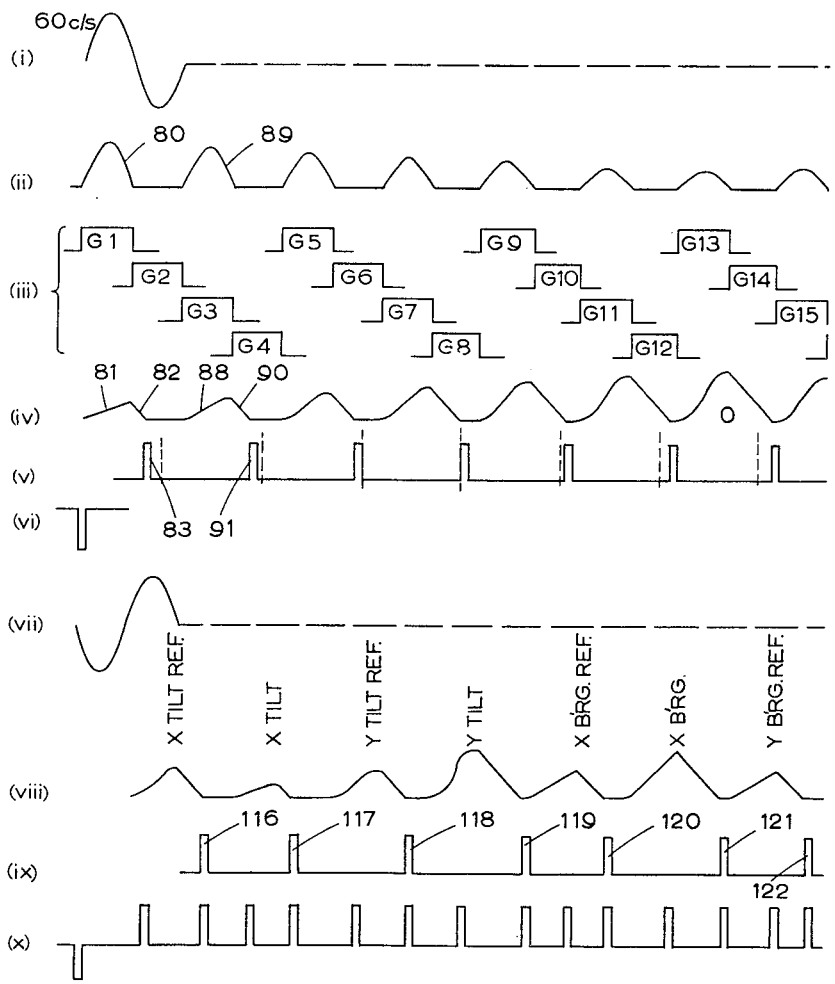
FIG.6 (part I)
Inventor
J. J. Jarrett
By Glascock Downing Seebold
Attys.

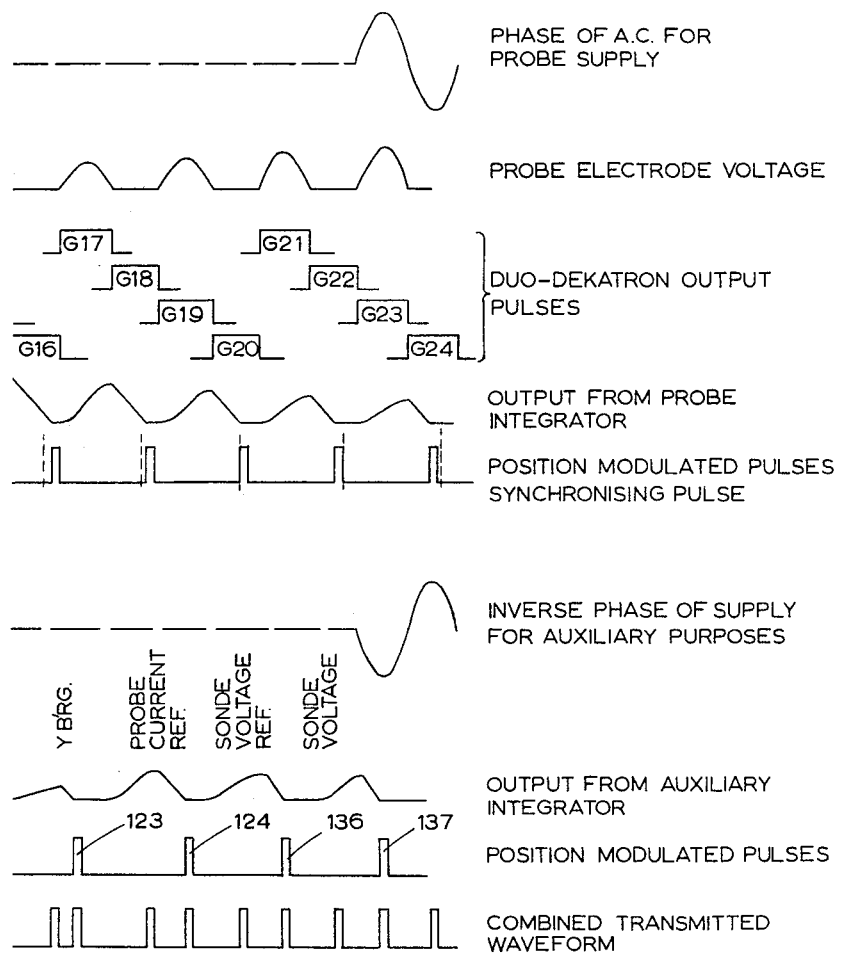
FIG.6 (part II)

Nov. 20, 1962  J. J. JARRETT  3,065,405
BOREHOLE SURVEY APPARATUS
Filed Dec. 16, 1958  12 Sheets-Sheet 7

Inventor
J. J. Jarrett
By Glascock Downing Seebold
Attys.

Nov. 20, 1962 J. J. JARRETT 3,065,405
BOREHOLE SURVEY APPARATUS
Filed Dec. 16, 1958 12 Sheets—Sheet 8

Inventor
J. J. Jarrett

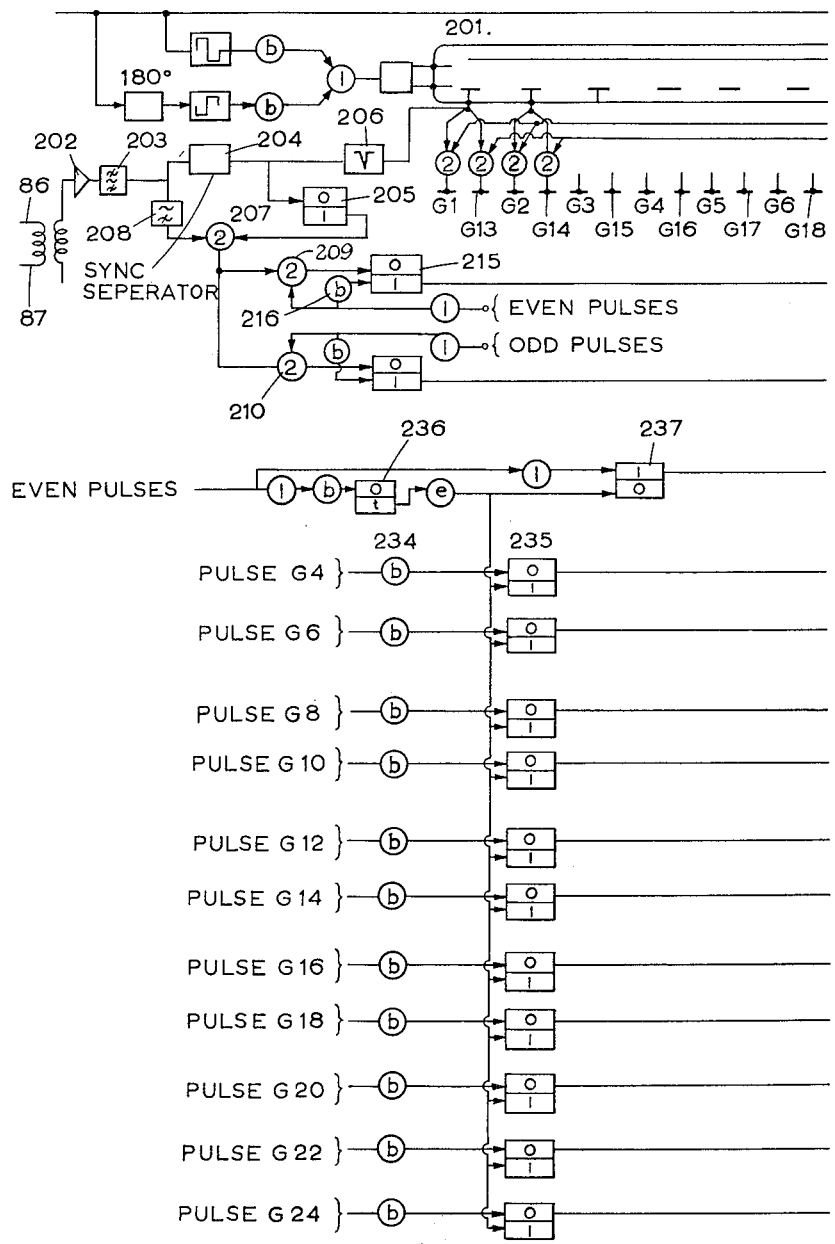
FIG.10(part I)

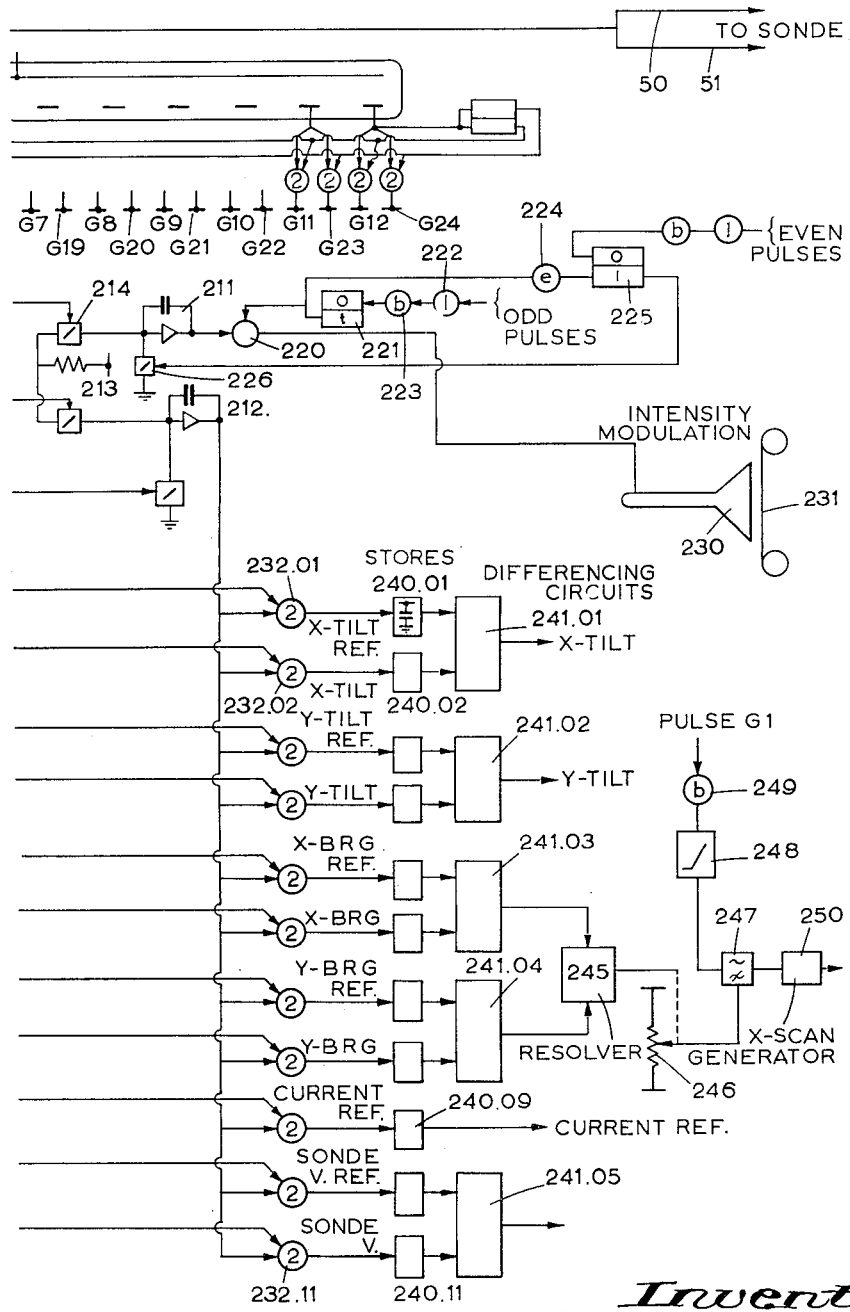

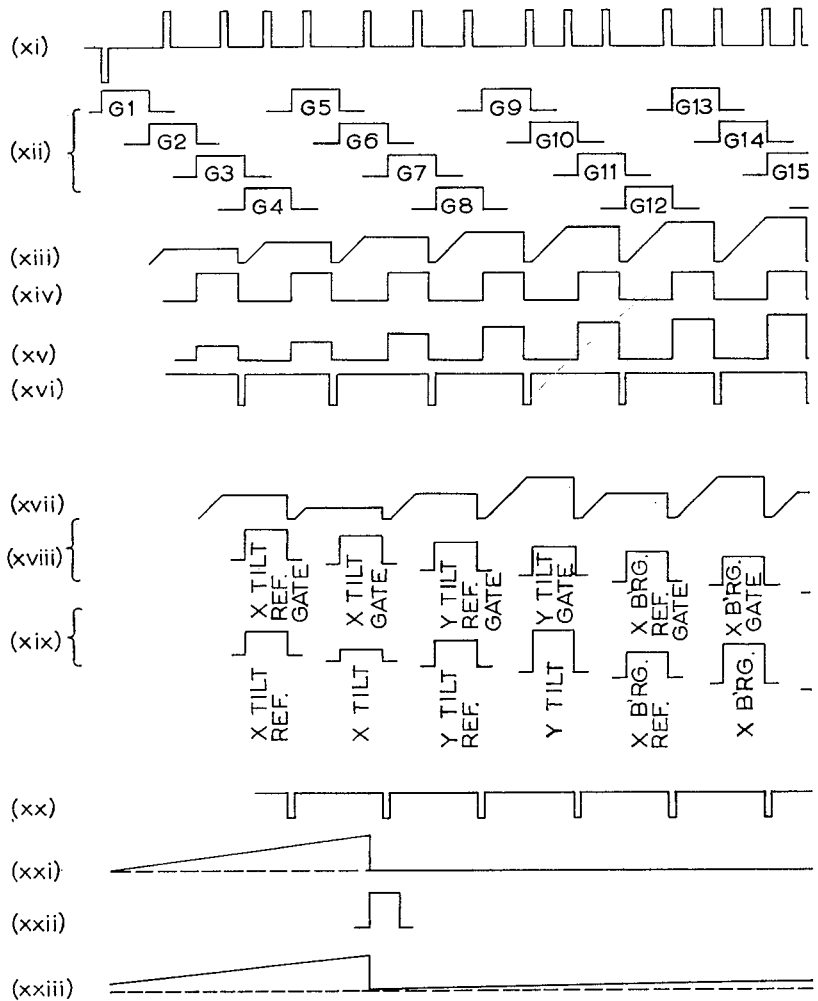
FIG.11(part I)

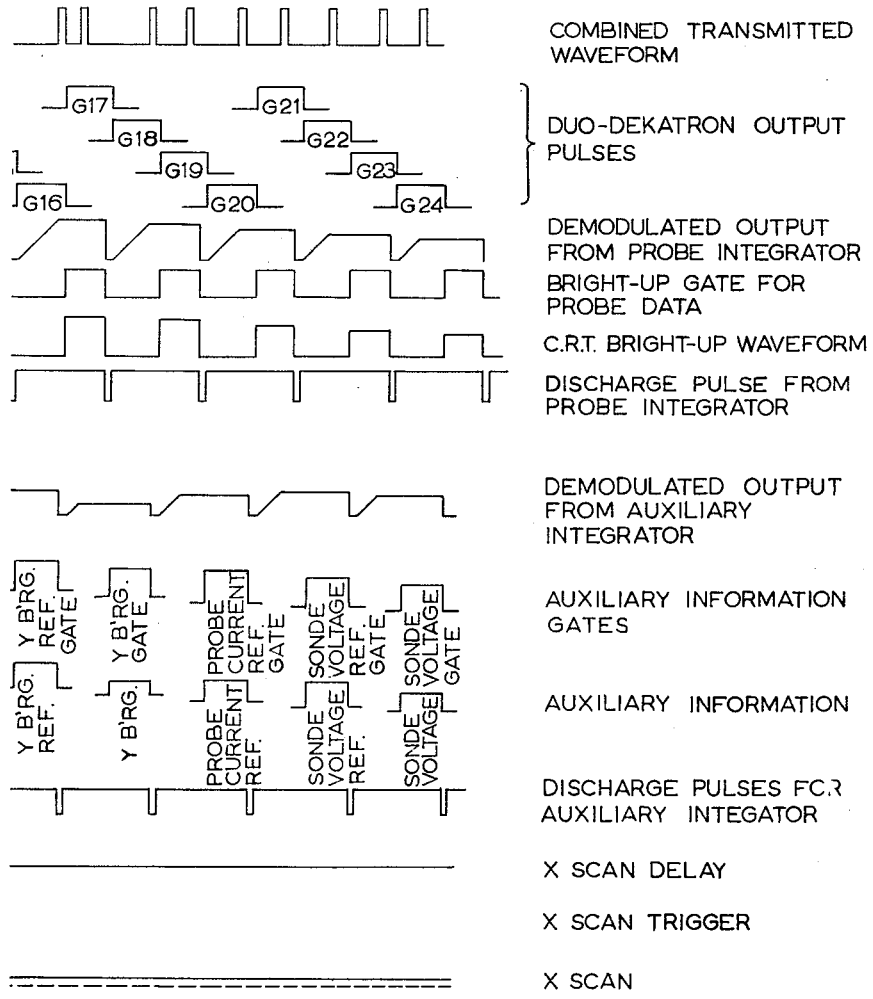
FIG.11(part II)

United States Patent Office 3,065,405
Patented Nov. 20, 1962

3,065,405
BOREHOLE SURVEY APPARATUS
John James Jarrett, Higher Denham, England, assignor to Electric & Musical Industries Limited, Hayes, England, a company of Great Britain
Filed Dec. 16, 1958, Ser. No. 780,831
25 Claims. (Cl. 324—1)

This invention relates to borehole survey apparatus, as used for example for investigating the interfaces of underground rock strata.

It has been proposed to carry out underground surveying with the aid of a device, known as a sonde, which is lowered down a borehole. As hitherto proposed, a typical sonde has three electrodes, called "probes," equiangularly disposed about the longitudinal axis of the sonde and voltages are applied to the probes to cause current to flow outward to the surrounding strata, the value of the current flowing from any one probe depending upon the applied voltage and the resistivity of the layer immediately opposite the respective probe. As each kind of layer or stratum is characterised by a particular specific resistance it is possible, by observing the applied voltage and the variations of the individual probe currents as the sonde is lowered down or pulled up the borehole, to locate the interfaces between different strata and if the azimuth and vertical inclination of the sonde is known, to determine the angle of dip of the interfaces, for which reason this surveying process is sometimes referred to as dip-metering.

However, substantial difficulty is experienced in obtaining accurate results from a sonde such as described in the preceding paragraph. The borehole may extend to great depths and is usually filled with fluids which impose great pressures on the sonde. The temperature of the fluids may moreover be as high as 100° C. The sonde must therefore be capable of operating under most arduous conditions and be able to withstand considerable ranges of operational temperatures and pressures. The sonde is usually suspended by means of a winch cable in which four conductors are embedded. Three of these conductors are used to carry a measure of the individual probe currents up to the surface so that they can be measured by instruments, whilst the fourth conductor carries current for the probes and for the casing of the sonde which acts as a guard "ring" for the probes so as to constrain the probe currents to flow substantially radially outward on a confined beam. For determining the attitude of the sonde it has been usual hitherto to include in the sonde a compass, and a ball bearing supported in a saucer shaped dish and to photograph these components at discrete instants by means of a camera in the sonde, so as to obtain a record of the attitude of the sonde. With this procedure it will be realised that the actual results obtained from the surveying operation cannot be analysed until the sonde is brought to the surface and until the photographs are developed and printed and co-related with the information previously obtained about the probe currents. This process of co-relation is moreover time consuming.

The accuracy of the results obtained are also limited by cross-talk between the different conductors of the cable. The sonde is usually energised from a 60 cycle supply and screening of the conductors is practically impossible. Moreover as the borehole may extend to many thousands of feet it is evident that the degree of cross talk between the co-extensive conductors may be substantial.

The object of the present invention is to reduce one or more of the difficulties indicated in the preceding paragraphs in such a way as to improve the resolution which can be obtained by means of a sonde in borehole surveying.

According to the present invention there is provided a borehole survey apparatus comprising a sonde having a plurality of probe electrodes disposed to allow the passage of current to surrounding strata, an electrical circuit for conveying electrical energy to said electrodes from a position exterior to the sonde, another electrical circuit for conveying intelligence to said exterior position according to the current passed by said probe electrodes, said other circuit including means for deriving pulses which are time modulated to represent the respective currents and which are arranged to share said other circuit on a time division basis.

By transmitting the intelligence on the time division basis, the effect of cross talk between the signals relating to the different electrodes is substantially reduced, and by adopting time modulated pulses to represent the currents passed by the respective electrodes, the effect of cross talk between the two electrical circuits is also reduced. The usual type of cable can therefore be used for lowering and raising the sonde, one electrical circuit comprising for example two of the conductors in the cable and the other electrical circuit comprising the other two conductors therein.

According to a preferred form of the invention means are provided for supplying alternating electrical energy to the probe electrodes from said exterior position by the first electrical circuit, and the sonde includes commutating means for sampling the current passed by said electrodes in cyclic order, the current of any one electrode being sampled, in a commutation cycle, for or during one half cycle of the energy. The sampling of the current passed by said electrodes is effected only during half cycles of the applied energy of a single polarity, so that the sampling occurs during alternate half cycles of the alternating energy, and means are furthermore provided for allocating the intervals occupied by the intervening half cycles of the energy for the transmission of the signals which are time modulated to represent the current passed by the respective electrodes. Furthermore, means are provided for transmitting during half cycles when the current to electrodes is sampled, signals which are time modulated according to the attitude of the sonde. The time modulation of the last mentioned signals may for example represent two components of the bearing angle of a horizontal reference in the sonde and two further signals which represent two components of the tilt of the sonde. The signals representing the components of the bearing angle may be derived from an inductor compass mounted on a gimbal platform and the components of tilt may be derived from means responsive to the setting of the platform with respect to one gimbal member and to the setting of the gimbal member with respect to the sonde.

Preferably moreover probe electrodes substantially greater in number than three are angularly disposed about the longitudinal axes of the sonde. The number may for example be 12 and is preferably predetermined in relation to the frequency of the applied energy and to the upper limit of speed of the sonde in the borehole to ensure energisation of each electrode once in every half inch of movement of the sonde. In this way the resolving power of the sonde is substantially enhanced.

The present invention facilitates rapid analysis of the results of the survey, and it also offers the advantage that continuous calibration and metering is possible whereby waste of time due to equipment drift and component failure can be minimised. The increased number of electrodes gives greater resolution which is of significant advantage in areas where interfaces having small dip angles may be encountered.

Figure 2:
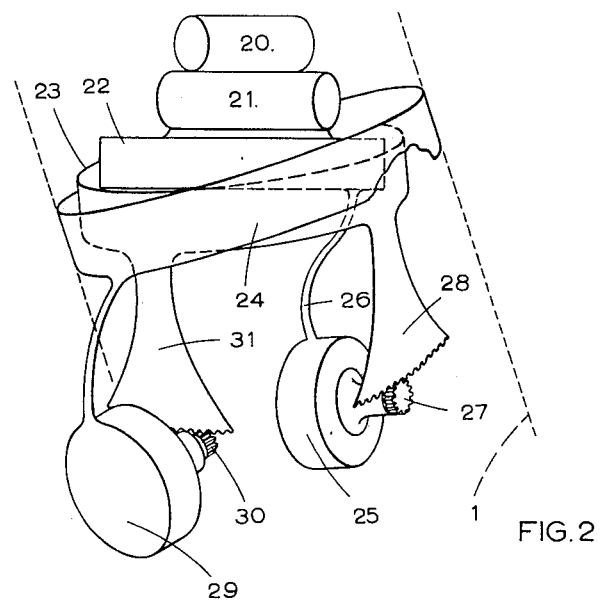
Figure 3:
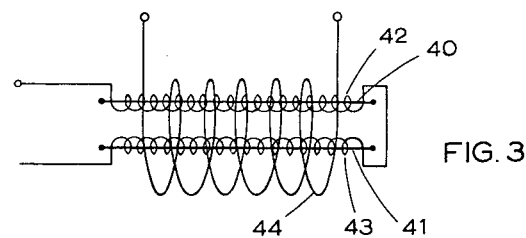
Figure 4:
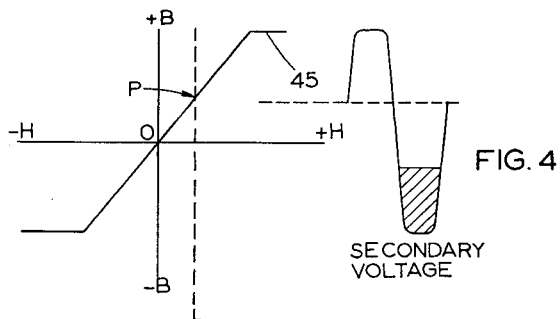
Figure 7:
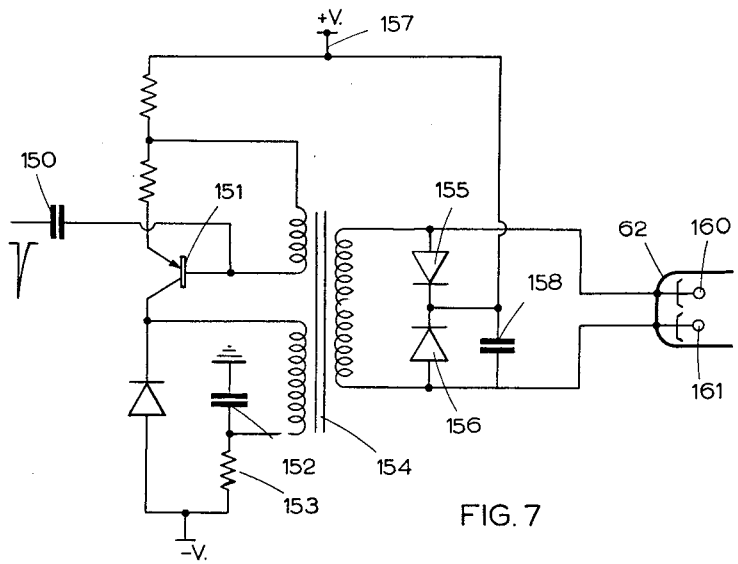
Figure 8:
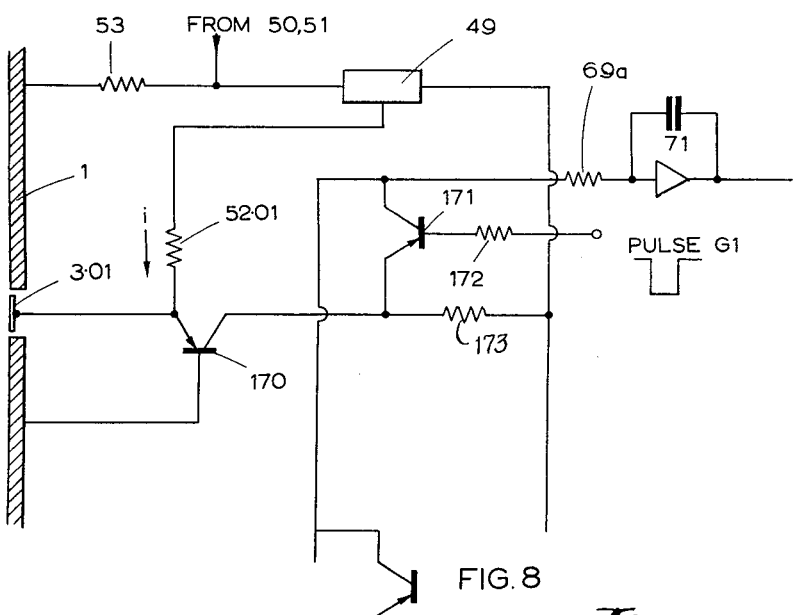
Figure 12:
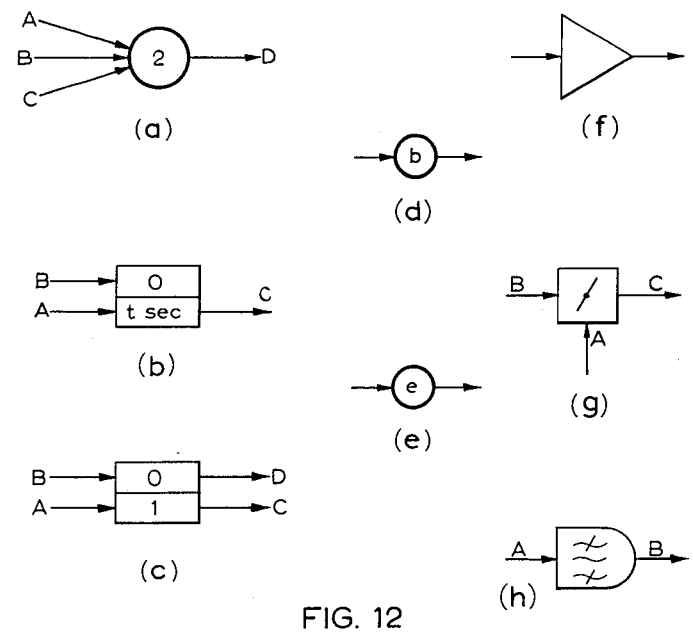
Figure 9:
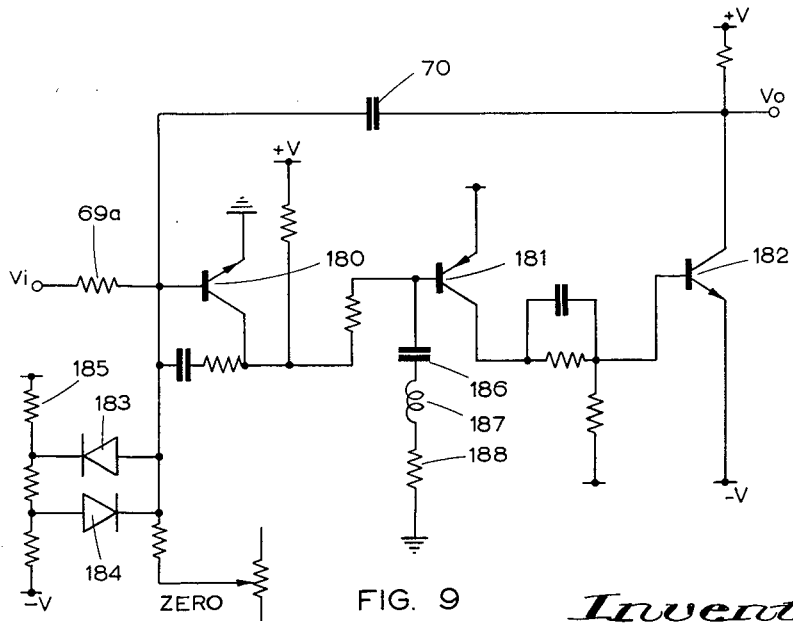

In order that the present invention may be clearly understood and readily carried into effect, the invention will now be described with reference to the accompanying drawings, in which:

FIGURE 1 is an exterior view of a sonde forming part of borehole survey apparatus according to one example of the invention, the positioning of the internal equipment of the sonde being indicated, FIGURE 2 is a perspective view of the equipment of the sonde for deriving signals from which the attitude of the sonde may be determined, FIGURE 3 is a circuit diagram of a unit part of an inductor compass illustrated in FIGURE 2, FIGURE 4 is a waveform diagram illustrating the operation of the inductor compass, FIGURE 5 is a symbolic diagram of the equipment in the sonde for deriving time modulated signals representing among other things the current flowing from the probe electrodes of the sonde, FIGURE 6 comprises waveform diagrams explanatory of the operation of FIGURE 5, FIGURE 7 is a circuit diagram of a duo-dekatron drive circuit included in the equipment illustrated in FIGURE 5, FIGURE 8 is a circuit diagram of one of the probe electrode switches included in the equipment illustrated in FIGURE 5, FIGURE 9 is a circuit diagram of the integrator included in the equipment illustrated in FIGURE 5, FIGURE 10 is a symbolic diagram of the surface equipment of the borehole survey apparatus according to the example of the invention aforesaid, the surface equipment being arranged to demodulate the signals derived from the sonde, FIGURE 11 comprises waveform diagrams explanatory of the operation of FIGURE 10, and FIGURE 12 depicts the symbols used in FIGURES 5 and 10 to illustrate various well known elementary circuits included in the equipment.

Before describing the borehole survey apparatus illustrated in FIGURES 1 to 11 of the drawings, reference will be made to FIGURE 12. In this figure, symbol $a$ represents a gate which produces an output signal on the lead D if an input signal is applied to one or more of the input leads A, B and C. The number of input leads may be varied. The threshold of the gate is indicated by a numeral within the symbol, for example the numeral 2 as shown which signifies that an output is produced at D only if an input signal is applied simultaneously to two or more input leads.

Symbol $b$ represents a monostable trigger circuit. If a trigger pulse is applied on the input lead A, the circuit is switched to its unstable state and produces an output signal on the lead C, of duration not exceeding $t$, as determined by the time constant of the circuit in its unstable state. After time $t$ the circuit returns by itself to its stable state, but the return to the stable state may be induced before the time $t$ by the application of a trigger pulse by way of the lead B.

Symbol $c$ represents a bistable trigger circuit which produces an output signal on the lead C when the circuit is in one of its stable states termed the "1" state. If the circuit is in its other stable state, termed the "0" state, an output signal is produced on the lead D. The circuit can be switched from the "0" state to the "1" state by applying a trigger pulse to the input lead A and can be changed from the "1" state to the "0" state by applying a trigger pulse to the input lead B.

Symbol $d$ represents a beginning element which produces a short output pulse in response to the leading edge of an applied input pulse. The circuit may comprise a differentiating circuit followed by a limiter, the latter being provided for the purpose of removing the pulse which is produced in response to the trailing edge of the applied pulse, which of course is of opposite polarity to that produced in response to the leading edge.

Symbol $e$ represents an end element which produces a short output pulse in response to the trailing edge of an applied pulse. An end element may be of similar construction to a beginning element.

Symbol $f$ represents an amplifier.

Symbol $g$ represents an analogue switch which is normally open circuited but is closed when a switching signal is applied on the lead A. When the switch is closed, a voltage applied to the lead B is transferred to the output lead C.

Symbol $h$ represents an analogue discriminator and is arranged to produce an output pulse on the lead B when a voltage applied to the input lead A reaches a specified level.

Referring now to FIGURE 1, the sonde of the borehole survey apparatus comprises an elongated substantially cylindrical stainless steel housing 1 constructed to withstand relatively high pressure. The sonde may be about four feet long and three inches in diameter and is suspended by means of a cable 2 from a winch (not shown), only a fragment of the cable being shown in FIGURE 1. The cable is of the type normally employed and has four 17-strand steel cores in each of which are enclosed two copper wires so that the cable contains four effectively insulated conductors. As will appear, two of the conductors are joined in parallel and used for applying energy to the sonde, the supply circuit being completed by an earth return. The other two conductors form the "go" and "return" paths of the signal circuit of the apparatus. In the vicinity of the centre of the sonde a series of twelve probe electrodes 3 are equiangularly disposed about the axis of the sonde in the same transverse plane. Each electrode is electrically insulated from the surrounding portion of the steel casing and the steel casing is arranged to act as a guard electrode for all the probe electrodes. Each probe electrode is preferably diamond shaped as indicated, to give improved resolution. The equipment within the sonde will be described in greater detail subsequently but it may be indicated that switches for gating the signals in cyclic order to the probe electrodes are located within the probe in a central region indicated by the reference 4. Above the switches an integrator is located in the region 5, a modulator amplifier in the region 6 and circuits for deriving direct current energy from the A.C. supply in the region 7. Below the switches are located a duo-dekatron commutator in the region 8, an auxiliary integrator in the region 9, and components for determining the attitude of the sonde in the region 10. The latter components are housed in a non-magnetic compartment. In FIGURE 1 the borehole 11 is represented in vertical section while one interface of the surrounding strata is indicated by the inclined line 12.

All the equipment within the sonde uses transistor valves and these are of the silicon type in view of the high temperatures likely to be encountered. Furthermore the circuits for deriving direct current energy in the region 7 may be conventional and will not be further described. The direct current energy is used for polarising the transistors and the duo-dekatron, and so on.

The components for determining the attitude of the sonde comprises two inductor units 20 and 21 which are mounted with their longitudinal axes at right angles to each other so as to form an inductor compass. The units 20 and 21 are mounted on a platform 22 which is pivoted about one transverse axis to one gimbal ring 23, which in turn is pivoted about another transverse axis to another gimbal ring 24. The two gimbal axes are of course mutually perpendicular. A rotary potentiometer 25 is fixed by an arm 26 to the platform 22 of the gimbal, the potentiometer being of a low torque type and having a pinion 27 on its spindle. This pinion is engaged by a toothed quadrant 28 attached to the gimbal ring 23 in such a way that if the ring 23 pivots with respect to the platform 22, a corresponding rotation is imparted to the shaft of the potentiometer. A similar low torque potentiometer 29 is attached to the gimbel ring 24 and a toothed pinion 30 on the shaft of this potentiometer is engaged by a quadrant 31 attached to the gimbal ring 33 so that rotation is imparted to the shaft of the potentiometer 29 if the inner ring pivots with respect to the outer ring. The platform 22 is made heavily pendulous so as to reduce the effect of sonde movement on the inclination of the inductor units 20 and 21. The potentiometer 25 is termed the X-tilt potentiometer and as will appear, the output signal derived from it is used as a measure of one component of tilt of the sonde with respect to the vertical. Similarly the potentiometer 29 is termed the Y tilt potentiometer. The outer gimbal ring 24 is fixed to the sonde casing and therefore if the sonde should twist about its longitudinal axis in the borehole, the longitudinal axes of the inductor units 20 and 21 will rotate in a horizontal plane with respect to the magnetic north direction and signals are derived from them representing two components of the bearing angle of a fixed reference in the sonde with respect to magnetic north.

As shown in FIGURE 3 each inductor unit consists of two thin wires 40 and 41 of high magnetic permeability each of which is closely overwound with a primary exciting winding, the two windings being denoted by the reference 42 and 43 respectively. These windings are energised with alternating current having a frequency of, say, one kilocycle per second. This alternating current can be derived from an oscillator of conventional construction, represented in block form in FIGURE 5. The primary windings are in turn enclosed in a common secondary winding 44 from which an output is taken. Assume that each of the wires 40 and 41 has a B/H characteristic curve such as represented by the line 45 in FIGURE 4. The characteristic curve is of course idealised. Assume also that the alternating current applied to the primary windings is sufficient to produce magnetic saturation of the samples. These windings are wound in opposite senses so that their magnetic fields oppose each other. Therefore in the absence of any external field the operating point of the secondary winding 44 is the point O of FIGURE 4, and no flux cuts the secondary winding, so that no voltage is induced in it. When however the inductor unit is exposed to the earth's magnetic field, the wires 40 and 41 will be magnetised in proportion to the component of the earth's field along the direction of the wires. Assume for example that the operating point is moved as a result of the earth's magnetic field to the point P in FIGURE 4. This unbalances the flux due to the individual primary windings within the secondary winding and the resultant change of flux density induces an output voltage in the secondary winding 44. This voltage has twice the frequency of the energy applied to the primary windings and a substantially sinusoidal signal can be derived by suitably filtering the output signal to remove harmonics. The amplitude of this sinusoidal output will moreover vary in accordance with the angle between the longitudinal axis of the unit and magnetic north direction, and although the amplitude of the sinusoidal output will be the same for equal positive and negative angles, the phase of the output will indicate the sign. Therefore, as will appear, each unit of the inductor compass is followed by a phase sensitive rectifier in order to resolve the ambiguity as to the sign of the angle. The other unit of the magnetic compass has an identical construction to that described and it will be appreciated that from the two outputs the bearing of the sonde can be derived.

In FIGURE 5, the oscillator which supplies the energising oscillation to the primary windings of the inductor compass units 20 and 21 is denoted by the reference 46. Furthermore the two primary windings of the individual units are shown as one and those for the unit 21 say are denoted by the common reference 42—43 whilst those for the unit 22 are denoted by the common reference 42a—43a. The secondary winding for the unit 20 is denoted by the reference 44 and that of the unit 21 by the reference 44a.

In FIGURE 5 two of the twelve probe electrodes are denoted by the reference 3.01 and 3.12, the two electrodes being taken as the first and the last of the series of twelve. The references 50 and 51 denote fragments of two opposite conductors in the winch cable 2, namely the two connected in parallel to form the high potential lead of the circuit for supplying energy from the surface to the sonde. As indicated previously, the return lead of this circuit is provided by earth. The D.C. power for the sonde is supplied by a circuit 48, which derives energy from the leads 50 and 51 by way of a transformer 47. The voltage on the leads 50 and 51 is represented by the waveform diagram (i) and is a 60 cycle alternating voltage. This voltage is applied in parallel to the probe electrodes by way of a D.C. bias source 49 and by way of resistors, two of which, shown in FIGURE 6, are denoted by 52.01 and 52.12. The function of the bias source will be indicated later. It will be understood that source 49 is in fact a component of the circuit 48. The voltage is also applied by way of resistor 53 to the casing 1 of the sonde. The voltage on the conductors 50 and 51 is also applied to a limiter 54 and thence is applied to a beginning element 55. The voltage on the conductors 50 and 51 is also applied to a phase inverter circuit 56 and thence to a limiter 57 and beginning element 58, which latter are similar to 54 and 55. The beginning elements 55 and 58 produce trigger pulses alternately during successive half cycles of the waveform (i) and these pulses are applied via a buffer gate to a pulse generator 59 which provides the shift pulses for the guide electrodes 60 and 61 of a duo-dekatron 62.

The D.C. supply connections for the duo-dekatron are not shown but the anode is represented by the reference 63 and the cathodes are denoted by the reference 64.01 to 64.12. Each cathode lead includes two gates each of threshold 2 denoted by the references 65.01 to 65.24 respectively. The last cathode 64.12, is connected to the input leads of a bistable trigger circuit 66 and one output lead of this circuit provides a second input to twelve of the gates 65 namely 65.01 to 65.12 which are the gates in the left hand branches of the cathode circuits. Similarly the other output lead of the trigger circuit 66 provides a second input for the remaining gates 65.13 to 65.24 which are in the right hand branches of the cathode circuits. The output leads of the first 12 gates, 65.01 to 65.12 provide gating pulses G01 to G12, FIGURE 6 (iii), and are connected to the switching leads of twelve analogue gates associated with the probe electrodes 3. Two of the gates, shown in FIGURE 5, have the reference 68.01 and 68.12 and as shown their input leads are connected directly to the respective probe electrodes. The output leads of all the gates 68.01 to 68.12 are connected together and are connected via a resistor 69a to the input terminal of an amplifier 69 which has a negative feedback circuit including a capacitor 70. The components 69a, 69 and 70 form a Blumlein integrator denoted generally by the reference 71. The output of the integrator 71 is applied via an analogue discriminator 72 to a buffer gate 73. The output of the first of the gates 65, namely G01, is, as shown, also applied to a beginning element 74, which is followed by a pulse generator 75 arranged to generate a synchronising pulse each alternate time the discharge in the duo-dekatron is located on the first cathode 64.01. The pulse generator 75 is in this example arranged to generate a negative pulse, represented by the waveform (vi) in FIGURE 6, so that the pulse is readily distinguishable from other pulses, although the generator 75 may be arranged to generate a pulse which is distinguishable by reason of some other characteristic. The input terminal of the amplifier 69 is, moreover, connected by way of an analogue gate 76 and a resistor 77 to a terminal 78, to which a negative reference voltage is applied. The input terminal of the amplifier 69 is further connected via an analogue gate 79 to earth. The switching signals for the gate 76 are obtained from all the even numbered gates 65, comprising namely the pulses G02, G04, etc. On the other hand the switching signal for the gate 79 is obtained from the amplitude discriminator 72.

In operation of the part of FIGURE 5 so far described, it will be assumed that the discharge in the duo-dekatron 62 has just returned to the first cathode 64.01 and that the trigger circuit 66 has been switched to the "1" state. Generation of a synchronising pulse by the generator 75 is therefore initiated. The current taken by the cathode 64.01 produces an output pulse from the gate 65.01 having a duration corresponding to one half cycle of the voltage on the leads 50 and 51. This is the gate pulse G1 in waveform (iii), FIGURE 6. The gating pulse G1 connects the probe electrode 3.01 to the integrator 71 and therefore, during the "first" half cycle of the alternating voltage on the leads 50 and 51 that voltage set up at the probe electrode 3.01 is integrated in the capacitor 70. The voltage which is integrated is that developed between the probe electrode and "ground" due to the resistance of the adjacent stratum, when that resistance is traversed by the current flowing from resistor 52.01. Assume that 80 in waveform (ii), FIGURE 6, represents the voltage on the probe electrode 3.01 during the gating pulse G1, and that the portion 81 in waveform (iv) represents the output of the integrator 71 during the same gating pulse. When the discharge shifts to cathode 64.02 gating pulse G1 ends and gating pulse G2 begins. This disconnects the input electrode of the integrator 71 from the probe electrodes and instead connects it via the gate 76 and the resistor 77 to the negative reference voltage applied to the terminal 78. The output voltage of the integrator then declines at a predetermined rate, as represented by the portion 82 of the waveform (iv). However as soon as the output voltage of the integrator tends to pass below zero, an output pulse 83, FIGURE 6 (v) is produced by the amplitude discriminator 72 which pulse is applied to the buffer gate 73 and also to the analogue switch 79. As a consequence the switch 79 is opened and the input electrode of the amplifier 69 is grounded so preventing any further decrease in the output voltage. The output pulse applied to the buffer gate 73 passes through this gate to an amplifier 84 and after amplification therein is applied across the primary winding of an output transformer 85. This transformer has a centre tapped secondary winding the ends of which are connected to the other two opposite conductors of the cable 2, parts of these conductors being denoted in the drawing by the references 86 and 87.

The discharge in the duo-dekatron 62 next shifts to the cathode 64.03 producing gating pulse G3 of waveform (iii) of FIGURE 6. When this gating pulse occurs, the gates 76 and 79 are closed (that is open-circuited) and the gate 68.02 (not shown) is opened, connecting the integrator 71 to the probe electrode 3.02. The process already described in connection with electrode 3.01 is repeated causing the output voltage of the integrator 71 to vary according to the portion 88 of FIGURE 6, waveform (iv), the assumption being that the voltage on the probe electrode 3.02 is represented by the portion 89 of the waveform (ii). During gating pulse G4, the output voltage of the integrator 71 again declines according to the waveform portion 90 at the predetermined rate and produces an output pulse 91 when the integrator output tends to fall below zero. It will be observed in relation to the pulses 83 and 91 that their timing is determined by the amplitude of the voltages 80 and 89 on the probe electrodes 3.01 and 3.02. The same process is repeated for the other probe electrodes up to the electrode 3.06, by which time the discharge has reached the cathode 64.12 in the duo-dekatron 62. The trigger circuit 66 is then switched to its alternate state and consequently during the next traverse of the discharge from the cathode 64.01 to the cathode 64.12 the gates 65.01 to 65.12 remain closed and the gates 65.13 to 65.24 are opened in succession. During the odd numbered gating pulses G13, G15 and so on, the probe electrodes 3.07 to 3.12 are connected in succession to the integrators, and during the even numbered gating pulses G14 to G24, the integrator output voltage declines at a predetermined rate to produce further output pulses which are time modulated in accordance with the respective strata resistances. One complete sequence of time modulated pulses corresponding to the 12 probe electrodes is shown in the waveform (v), FIGURE 6, and a cycle of modulation is completed by the 12 pulses. The pulses represent the condition that the layer to one side of the probe has a relatively high specific resistance and that the layer to the opposite side of the probe has a relatively low specific resistance.

The equipment shown in FIGURE 5 incorporates a second Blumlein integrator 100 comprising an amplifier 101 and capacitor 102, this integrator being used to time the pulses which are used inter alia to convey the intelligence regarding the attitude of the sonde to the surface equipment. The input electrode of this integrator is connected through an integrating resistor 102a to the output leads of analogue gates 103.01 to 103.06. The switching leads of these gates are connected respectively to the gates 65 in the cathode leads of the duo-dekatron 62, as indicated in the drawing by the legends near the respective gates. The input lead of the gate 103.01 is connected to an adjustable tap on the shaft of the Y tilt potentiometer 29 which as shown is connected between earth and the conductors 50 and 51 which supply the energising voltage from the surface equipment. The input lead of the gate 103.02 is connected to the centre tap of the Y tilt potentiometer 29. The input leads of the gates 103.03 and 103.04 are connected respectively to the adjustable tap and to the mid point of the X tilt potentiometer 25 which is connected in parallel with the Y tilt potentiometer 29. A circuit 104 for imparting 180° phase shift to the applied alternating energy is interposed between the conductors 50, 51 and potentiometers 25, 29. The secondary windings 44, 44a of the inductor units 20 and 21, which constitute the inductor compass, are connected to the inputs of two filters 105 and 106 which remove harmonics, leaving the fundamental frequency of the secondary winding output voltage which as aforesaid is twice the frequency of the oscillator 48. The outputs of the filters are applied via amplifiers 107 and 108 respectively to two phase sensitive rectifiers 109 and 110 to which reference oscillations are applied directly from the oscillator 48, as shown. The outputs of the phase sensitive rectifiers are analogue voltages of which the magnitude and sign represent components of the bearing of the sonde, and these outputs form the inputs to the gates 103.05 and 103.06. The input electrodes of the amplifiers 107 and 108 are respectively connected to ground through analogue gates 111 and 112 which receive gate pulses G14 and G10 from the gates 65.14 and 65.10 respectively. The output of the integrator 100 is applied to an amplitude discriminator 113, similar to 72, and the output of the discriminator 113 is applied to the buffer gate 73 and also to the switching signal lead of an analogue gate 114, which corresponds to the gate 79, whilst another analogue gate 115 corresponds to 76. The gate 115 receives gating pulses from all the odd numbered gates 65.

The waveforms corresponding to the operation of the parts of the circuit associated with the integrator 100 comprise the diagrams (vii) to (x) in FIGURE 6. From these diagrams it is apparent that the operating conditions of the two integrators 71 and 100 are interlaced, in the sense that the output potential of one integrator is rising whilst that of the other is falling, and vice versa. Thus during gating pulse G1 the gate 115 is open and as there is no charge in the integrating capacitor 102, the output of the integrator remains at earth potential. During gating pulse G2 the input of the integrator is connected through the gate 103.04 to the mid point of the X tilt potentiometer 25 so the output of the integrator rises to a level depending upon the half amplitude of the alternating waveform (vii), which is the same as the waveform (i) but phase reversed. During gating pulse G3, gate 115 is again open and the output voltage of the integrator 100 declines at a predetermined rate until it reaches earth potential, whereupon the amplitude discriminator 113 generates an output pulse which is applied via the buffer gate 73 and the amplifier 84 to the transformer 85. This pulse also opens the gate 114 and stops the discharge of the integrating capacitor. The respective pulses produced by the discriminator 113 is a reference pulse, denoted by 116 in the waveform (ix), FIGURE 6. The next gating pulse G4 opens the gate 103.03 and connects the integrator to the adjustable tap of the potentiometer 25 as a consequence of which the output pulse 117 which is produced during gating pulse G5 is timed to represent the X tilt of the platform 22 bearing the inductor compass. The timing of the pulse 117 relative to the pulse 116 gives not only the magnitude but the sign of the X tilt. During the gating pulses G6 to G9 two further time modulated pulses 118 and 119 are generated representing the position of the tap on the Y tilt potentiometer 29 with reference to the centre point thereof, thus giving the Y component of tilt of the platform 22 in magnitude and sign.

During the next four gating pulses G10 to G13 pulses 120 to 123 are generated by a similar process to that already described. The first two of these pulses 120 and 121 gives the X component of the bearing, the pulse 120 being a reference pulse whose timing corresponds to a bias applied to the input electrode of the integrator 100 when the gate 112 is opened simultaneously with a gate 138. The last mentioned gate connects the input electrode of the integrator via a resistance 125 to a terminal 126 to which a positive reference voltage is applied. The components 138, 125 and 126 are provided to bias the integrator when outputs are being obtained from 109 and 110, so that the integrator need only be capable of responding to positive input information, although the voltage output from 109 and 110 may be either positive or negative when the gates 111 and 112 are closed. The pulse 121 represents by its timing the output of the discriminator 110, since when the gate 112 is closed the amplifier receives the fundamental component of the signal generated across the secondary winding 44a. Pulses 122 and 123 similarly represents the Y component of the bearing.

With regard to the reference pulse 120 and 122, it may be pointed out that the closures of the gates 112 and 111 correspond respectively to the conditions when the inductor units 20 and 21 are, respectively, lying quadrantally to the horizontal component of the earth's magnetic field.

During the remaining gating pulses G18 to G23 the integrator 100 is operated to produce monitoring pulses. During pulse G18, a gate 127 is opened to connect the integrator 100 by way of a high stability resistor 128 to the supply point for the resistors 52. The resistors 52.01 to 52.12, and 128 are all large compared with the maximum resistance presented by different strata, and so the timing of the pulse produced during gating pulse G19, namely pulse 124 in waveform (x), FIGURE 6, represents by its timing the magnitude of the average current supplied by the resistors 52 to the respective probe electrodes. Gating pulses G20 and G22 are arranged to open gates 129 and 130 which are connected in series with two primary windings 131 and 132 of a transformer 133. The voltage across the common secondary winding of this transformer is applied via an emitter follower circuit 134 to a gate 135 which is opened by gating pulses G20 and G22. The output of the gate is applied via resistor 102a to the input terminal of the integrator 100. The primary winding 131 is connected across a secondary winding of the transformer 47 and therefore a pulse is produced during gating pulse G21 having a timing which is related to the current taken by the sonde. The primary winding 132 is connected from the casing 1 of the sonde to a ring which is attached to the cable at approximately 40 feet above the sonde, and the voltage on which is taken as earth, and therefore during gating pulse G23 a pulse is produced having a timing which represents the voltage on the sonde casing. The two last monitoring pulses bear the references 136 and 137 in waveform (ix) of FIGURE 6. In operation of the circuit the two waveforms (v) and (ix) are of course combined across the transformer 85 before being applied to the cable leads 86 and 87. The composite waveform during one complete cycle of operation is represented by the waveform (x) in FIGURE 6.

FIGURE 7 shows a preferred construction for the circuit 59. Short positive pulses derived from the beginning elements 55 and 58 are applied via a capacitor 150 to the base electrode of the transistor 151 which is connected in a blocking oscillator circuit, the blocking time of which is determined by the time constant of a capacitor 152 and a resistor 153. The output pulses from the blocking oscillator are applied across the secondary winding of the transformer 154 which is shunted by two diodes 155 and 156 having their junction connected directly to the positive supply terminal 157 of the circuit. A capacitor 158 is furthermore connected across the diode 156 and this arrangement has the effect that when the blocking oscillator fires, in response to a short pulse applied via the capacitor 150, pulses are applied in succession to the two guide electrodes 60 and 61 of the duodekatrons, which pulses just overlap each other as required.

FIGURE 8 shows the construction of one of the gates 68, say, the gate 68.01. The gate comprises a transistor 170 which has its base connected to the casing of the sonde and the emitter connected to the probe electrode and to the resistor 52.01. By virtue of these connections substantially zero potential exists between the respective probe electrode and the sonde casing. The collector of the transistor 170 is in turn connected to the emitter of a transistor 171, to the base of which pulse G1 is applied via a resistor 172. Resistor 173 forms the collector load of the transistor 170 and it is connected via the D.C. voltage supply 49 and the resistor 53 to the casing 1 of the sonde. The collector of the transistor 171 is connected to the input of the integrator 71 as are the corresponding collectors of all the other gates 68. With the gates shown, only the transistor 171 is switched by the respective gate pulse when the probe electrode current has to be sampled so that the condition of the transistor 170 is not changed between the sampling and quiescent states. Consequently the exterior potential field pattern around the sonde is not disturbed by switching.

A suitable construction for the integrator 71, and also for the integrator 100 is shown in FIGURE 9 and comprises essentially an odd number of common emitter stages with overall feedback via the capacitor 79 (assuming that FIGURE 9 illustrates the integrator 71). Three transistors are shown in FIGURE 9 having the references 180, 181, and 182. The voltage swing at the base of the transistor 118 is restricted by two crystal diodes 183 and 184 connected to tapping points on a potentiometer 185 as shown. These diodes prevent overloading of the transistors. The capacitor 186, the inductor 187 and resistor 188 connected to the base of the transistor 181 provide high frequency stability. The other connection to the transistors shown in FIGURE 9 are conventional.

In the surface equipment shown in FIGURE 10 a duo-dekatron tube is arranged in a circuit similar to that described with reference to the sonde equipment in such a way as to produce gating pulses synchronised with the pulses G1 to G24. The duo-dekatron is denoted by the general reference 201, and the gating pulses since they are synchronous with G1 to G24 are denoted by the same references. They comprise the waveform (xii) in FIGURE 11. Synchronisation of the two gating waveforms is achieved by applying the signals received over the conductors 86 and 97, which forms a balanced circuit, to an amplifier 202 and thence via an amplitude limiter 203 to a synchronising signal detector 204 which is responsive only to a synchronising signal by reason of its negative polarity and produces a trigger pulse in response to such a synchronising signal. This output signal is applied in parallel to a monostable trigger circuit 205 and to a blocking oscillator 206. The latter, in response to the trigger pulse produces a large negative pulse which is applied to the first cathode of the duo-dekatron circuit 201 so that each alternate cycle of the duo-dekatron in the surface equipment starts in synchronism with the corresponding cycle in the sonde duo-dekatron. It will be seen that in the surface equipment the 60 cycle alternating voltage which is applied to the sonde by the conductors 50 and 51 is also used to provide the shift signals in the duo-dekatron circuit 201.

The trigger circuit 205 when changed to its unstable state in response to a trigger pulse from 204, produces a gating pulse for a gate 207 which is therefore capable of passing the subsequent pulses in the waveform (x) of FIGURE 6, which for convenience is repeated as waveform (xi) in FIGURE 11. The trigger circuit 205 is set up in such a way that when the circuit is switched on initially it always establishes itself in a condition in which it disables the gate 207. In this way any information which arrives before the first synchronised pulse is prevented from passing to the demodulating circuits to be described. A limiter 208 is disposed to remove the negative synchronising pulse before the gate. From the gate 207 the time modulated pulses pass to a pair of gates 209 and 210 which are enabled alternately by odd and even gate pulses from the duo-dekatron circuit 201. The gates lead to two parallel demodulating channels which correspond to the two modulating channels in the sonde equipment containing respectively the integrator 71 and the integrator 100. One of the demodulating channels comprises an integrator 211 and the other comprises an integrator 212 having separate integrating capacitors but sharing the common resistor 213. The integrator 211 is used to demodulate the signals which convey information as to the probe electrode currents and this integrator undergoes a linear charging process when an analogue gate 214 is opened in response to a monostable trigger circuit 215 being switched to its unstable state. This occurs on the instant of the leading edge of each even gate pulse G by virtue of the presence of a beginning element 216 in a lead for applying the respective gating pulses to one input lead of the trigger circuit 215. The gate 214 is again closed (open-circuited) when a time modulated pulse is applied from the gate 209 to the trigger circuit 215 to restore it to its stable state. Therefore on the beginning of each even numbered gate pulse the integrator 211 starts a linear charging process and this charging process is terminated by the time modulating pulse received from the sonde during the occurrence of the respective gating pulse. The resultant output waveform for the integrator is then represented by the waveform (xiii) in FIGURE 11 and it will be seen that during successive even numbered gate pulses G2, G4 etc. the output voltage of integrator reaches a value corresponding to the timing of the respective pulses which in turn are representative of the current passed by the respective probe electrodes 3.01, 3.02 and so on.

The output voltage of the integrator 211 is stored into the following odd-numbered gate pulse time and is applied to a gate 220. This gate is enabled by a pulse derived from a monostable trigger circuit 221 which in turn is triggered to its unstable state by the leading edge of odd-numbered gate pulses G1, G3 etc., these being applied via a buffer gate 222 to a beginning element 223. The trigger circuit 221 is arranged to reset to the stable state after a predetermined time, somewhat less than one gate pulse duration and when the circuit 221 is reset, the end element 224 produces a short pulse which triggers the monostable circuit 225 to its unstable state, thereby producing a switching signal which opens a gate 226 and discharges the integrator 211. The monostable circuit 225 is reset to its stable state by a leading edge of even numbered gate pulses so as to condition the integrator 211 for another cycle. The output pulses from the trigger circuit 221 are shown in the waveform (xiv), FIGURE 11, and in addition to being used to trigger the circuit 225 they are used to enable the aforesaid gate 229 to apply the output voltage of the integrator 211 to the modulator electrode of a cathode ray tube 230. The voltage applied to the modulator electrode is represented by the waveform (xv) in FIGURE 11, and it causes intensity modulation of the trace of the cathode ray tube, which is in fact a single line trace. The trace is photographed on film 231 which moves past the face of the cathode ray tube at a speed related to the rate of movement of the sonde in the borehole. As will appear, the trace of the cathode ray tube is arranged to start in synchronism with the pulse in the waveform (xv) which represents the current passed by that probe electrode which is orientated in the direction of magnetic north. By this expedient the "up-dip" direction of an interface can be read directly from the film and the dip angle can easily be measured. However the technique of interpreting the information derived from the sonde constitutes no part of the present invention and will not be further described.

The operation of the integrator 212 is similar to that of 211 but the output voltage is gated to separate channels, according to the order of the odd numbered pulses in the waveform (xi). This gating is done by a series of gates 232.01 to 232.11. The pulses for enabling these gates are timed to begin on the occurrence of the leading edge of gating pulses G2, G4 . . . from the duo-dekatron circuit 201, these pulses being applied via beginning elements 234 to a series of bistable trigger circuits 235. A circuit including two monostable trigger circuits 236 and 237, similar to 221 and 225 is used to discharge the integrator 212 in the way already described with reference to the integrator 211. This circuit is also used to reset the trigger circuits 225 and so terminate the enabling pulses for the gates 232, which enabling pulses are initiated by the even numbered pulses G4 . . . G24.

By virtue of the arrangement shown in FIGURE 10, the information yielded by the gates 232 comprises pulses, the amplitude of which represent the desired intelligence. In this way the time modulation of the respective received pulses is converted into amplitude modulation, and the demodulation process is completed by applying the amplitude modulated pulses to a series of storage circuits 240.01 to 240.11. The outputs of these storage circuits are compared in pairs (except in the case of 240.09) by means of differencing circuit 241.01 to 241.05, to produce signals which represent respectively the X component of the tilt, the Y component of the tilt, the X component of the bearing, the Y component of the bearing and the sonde voltage. Since all these signals are derived by comparison with reference voltages, they provide an absolute measure of the respective quantities and are not susceptible to drift in component values and the like. The storage circuit 240.09 produces directly a monitoring signal for the probe current.

In FIGURE 11, waveform (xvii) represents the output voltage of the integrator 212, waveform (xviii) represents the enabling pulses produced by the trigger circuits 205 whilst waveform (xix) represents the amplitude modulated pulses which are derived from the gates 232 and applied to the respective storage circuits 240. Waveform (xx) represents discharge pulses for the integrator 212 these pulses being derived from the trigger circuit 237. The components of the bearing angle obtained from the differencing circuits 241.03 and 241.04 are fed to an electromechanical resolver 245 which has two stators the magnetic axes of which are mutually perpendicular, and a rotor winding which is D.C. energised. The resolver further includes a servomotor which is responsive to a signal derived from the rotor to rotate the rotor to a position where its output voltage is vanishingly small, the angular displacements of the rotor being then representative of the bearing angle, as is well known. By calibrating the rotor shaft, the latter can be used to give an indication of sonde orientation. Furthermore a low torque potentiometer 249 has its adjustable tap connected to the rotor shaft so as to produce a voltage which is an analogue of the bearing angle. This voltage is applied to an amplitude discriminator 247 to which is also applied a linear sawtooth such as represented by the waveform (xxi) in FIGURE 11, this sawtooth being initiated by the gating pulse G1 which is applied to the sawtooth generator 248 through a beginning element 249. No output is obtained from the discriminator 247 until the sawtooth amplitude attains the value of the voltage derived from the tap of the potentiometer 246, but when the sawtooth voltage attains this value, a pulse (xxii), FIGURE 11, is delivered by the discriminator 247 to trigger a scanning waveform generator 250 which produces a single line scan waveform for the cathode ray tube 230. This scan waveform is denoted by reference (xxiii) in FIGURE 11. In this way, as already indicated the scan is always arranged to start in synchronism with the signal from the probe electrode which is orientated in the direction of magnetic north.

The output voltage from the storage circuit 240.09 can be used to indicate any drift in the gain of the system.

What I claim is:

1. Borehole survey apparatus comprising a sonde having a plurality of probe electrodes disposed to allow the passage of current to surrounding strata, an electrical circuit for conveying alternating electrical energy to said electrodes from a position exterior to the sonde, translating means in the sonde for deriving pulses which are time modulated in response to the value of an applied signal, sampling means timed by said alternating energy for coupling said electrode cyclically to said translating means to cause said translating means to respond on a time-division basis to the currents passed by said electrodes taken in cyclic order, thereby to cause said translating means to produce successive pulses of which the time modulation is related to the resistance of said strata, and other circuit means for conveying said pulses to said exterior position.

2. Apparatus according to claim 1 wherein said sonde includes other means for deriving additional pulse signals which are time modulated according to the attitude of the sonde and which are arranged to share said other circuit with said first mentioned time modulated signals on a time division basis.

3. Apparatus according to claim 1 wherein said sonde comprises probe electrodes substantially greater in number than three and angularly disposed about the longitudinal axis of said sonde.

4. Apparatus according to claim 1 wherein said sampling means comprises a commutator having a plurality of output leads, said commutator being responsive to said alternating energy to produce gating pulses on said output leads in cyclic order and corresponding to different half cycles of said alternating energy, and a plurality of gates for connecting said electrodes respectively to said translating means, said gates being coupled to said output leads in cyclic order to cause said electrodes to be coupled to said translating means in cyclic order.

5. Apparatus according to claim 1, said other circuit means including, at said exterior position, timing means responsive to said alternating energy to produce timing signals at corresponding times during successive cycles of said alternating energy, and means for demodulating the time modulated pulse conveyed by said other circuit in relation to said timing signals.

6. Apparatus according to claim 2, wherein said means for deriving additional signals comprises means including an inductor compass for producing signals representative of the bearing of said compass with respect to the magnetic north direction.

7. Apparatus according to claim 3 wherein said sonde comprises twelve probe electrodes angularly disposed about said longitudinal axis, said alternating energy having a frequency of the order of 60 cycles per second.

8. Apparatus according to claim 3 wherein said probe electrodes are diamond shaped when viewed from the exterior of the sonde.

9. Apparatus according to claim 6 wherein said compass has a support pivoted to a gimbal member about a first axis and said gimbal member is pivoted to the sonde about a second axis perpendicular to said first axis, and said means for deriving additional signals comprises means for deriving one signal representing the tilt of the inductor compass with respect to said gimbal member and means for deriving a second signal representing the tilt of said gimbal member with respect to the sonde.

10. Apparatus according to claim 9 wherein said means for deriving said signals representing tilt includes rotary potential dividers having adjustable taps responsive to the respective tilt.

11. Apparatus according to claim 4, said commutating means including means for producing one gate pulse for each half cycle of said alternating energy, and said gates being coupled to those output leads of said commutator which receive gating pulses during alternate half cycles of said energy, and said translating means including means for producing the respective time modulated pulses during intervening half cycles of said alternating energy.

12. Apparatus according to claim 4 wherein said commutator comprises an electronic ring counter having a plurality of stages which are energised in succession in response to the application of successive shift pulses to said counter, means responsive to said alternating energy to derive shift pulses at corresponding times during successive cycles of said energy, and means for applying said shift pulses to said counter.

13. Apparatus according to claim 11 wherein said translating means comprises an integrator connected to integrate the signal passed through said gates, whereby said integrator generates an output signal of which the rate of variation during said alternate half cycles of said alternating energy is related to the resistance of said strata.

14. Apparatus according to claim 11 comprising a plurality of attitude-sensitive means for deriving signals having values which represent different components of the attitude of the sonde, additional translating means in the sonde for deriving time modulated pulses in response to the value of an applied signal, and additional sampling means responsive to the gating pulse produced by said commutator for coupling said attitude sensitive means to said additional translating means to produce pulses which are time modulated according to the attitude of the sonde and occur respectively during said alternate half cycle of said alternating energy.

15. Apparatus according to claim 13 said translating means further comprising means for applying a substantially constant signal to said integrator during said intervening half cycles of said alternating energy to restore the output signal of said integrator at a substantially constant rate to a datum value, and means for producing said time modulated pulses at times responsive to the restoration of the output signal of said integrator to said datum value.

16. Apparatus according to claim 14, said additional translating means comprising an additional integrator, and said additional sampling comprising a plurality of gates for connecting said attitude-sensitive means to said additional integrator in a cyclic order, said gates being coupled to those output leads of said commutator which receive gating pulses during said intervening half cycles of said alternating energy, whereby said additional integrator generates an output signal of which the rate of variation during said intervening half cycles of said alternating energy is responsive to the respective attitude-sensitive means.

17. Apparatus according to claim 14 wherein said other circuit includes two demodulating means exterior to said sonde, and a commutator synchronised with the sonde's commutator for applying signals derived from the sonde to said two demodulating means respectively during alternate half-cycles of said alternating energy.

18. Apparatus according to claim 14, wherein said attitude sensitive means derive operating energy from said alternating energy.

19. Apparatus according to claim 16 comprising means for applying a substantially constant signal to said additional integrator during said alternate half cycles of said alternating energy to restore the output signal of said additional integrator to a substantially constant rate to a datum value and means for producing said additional time modulated pulses at times responsive to the restoration of the output signal of said additional integrator to said datum value.

20. Apparatus according to claim 17 wherein said demodulating means each comprises an integrator, means for applying reference signals to the respective integrator at times determined by said commutator and means for removing said reference signal at times determined by received signals so as to produce an output signal from the integrator having values which are responsive dependent upon the timing of received signals.

21. Apparatus according to claim 17 comprising a cathode ray tube, means for modulating the intensity of the beam of said tube in response to the signals from the respective demodulator representing the resistances of different strata, and means for initiating successive line scans of said beam in synchronism with the signal corresponding to the probe electrode orientated in a predetermined direction.

22. Apparatus according to claim 17, comprising means in the sonde for generating a synchronizing signal each time the sonde's commutator attains a particular state, and means at said exterior position and responsive to said synchronising signal for switching the other commutator to the corresponding particular state.

23. Borehole survey apparatus comprising a sonde having a plurality of probe electrodes disposed to allow the passage of current to surrounding strata, a source of alternating electrical energy exterior to said sonde, an electrical circuit for conveying said energy from said source to said sonde, means responsive to said energy for feeding currents to said electrodes, and means including sampling means timed by the periods of said alternating energy for producing successive groups of time-multiplexed signals, the signals of each group being related respectively to the resistance of said stata and to the currents fed to said electrodes, and a circuit for conveying said time-multiplexed groups of signals to a position exterior to the sonde.

24. Borehole survey apparatus comprising a sonde having a plurality of probe electrodes disposed to allow the passage of current to surrounding strata, an electrical circuit for conveying alternating electrical energy to said sonde from a position exterior to the sonde, means responsive to said energy for feeding currents to said electrodes, means in said sonde for rectifying said energy to provide a direct current supply, translating means in the sonde deriving energy from said direct supply for deriving pulses which are modulated in response to the value of an applied signal, sampling means timed by the periods of alternating energy to cause said translating means to respond on a time-division basis to the currents passed by said electrodes taken in a pre-arranged order, thereby to cause said translating means to produce successive groups of time-multiplexed pulses related to the resistance of said strata, and a circuit for conveying said time-multiplexed pulses to a position exterior to the sonde.

25. Borehole survey apparatus comprising a sonde having a plurality of probe electrodes disposed to allow the passage of current to surrounding strata, an electrical circuit for conveying alternating electrical energy to said sonde from a position exterior to the sonde, means responsive to said energy for feeding currents to said electrodes, means including sampling means timed by the periods of said alternating energy for producing successive groups of time-multiplexed time-modulated pulses, the time modulations of the pulses of each group being related respectively to the resistance of said strata and to the currents fed to said electrodes, and a circuit for conveying said time-multiplexed time-modulated pulses to a position exterior to the sonde.

References Cited in the file of this patent

UNITED STATES PATENTS

| | | |
|---|---|---|
| 1,928,969 | Kuffel | Oct. 3, 1933 |
| 2,436,563 | Frosch | Feb. 24, 1948 |
| 2,617,852 | Waters | Nov. 11, 1952 |
| 2,813,248 | Ferre | Nov. 12, 1957 |
| 2,871,444 | Piety | Jan. 27, 1959 |